United States Patent
Zoldi et al.

(10) Patent No.: US 12,475,354 B2
(45) Date of Patent: Nov. 18, 2025

(54) CONSTRAINED DESIGNED AND GUIDED LATENT FEATURE SPACE CONTRIBUTIONS TO MACHINE LEARNING MODELS

(71) Applicant: FAIR ISAAC CORPORATION, Roseville, MN (US)

(72) Inventors: Scott Zoldi, San Diego, CA (US); Maziar Yaesoubi, Roseville, MN (US); Keerthi Kancherla, Roseville, MN (US); Todd Smith, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 967 days.

(21) Appl. No.: 17/588,057

(22) Filed: Jan. 28, 2022

(65) Prior Publication Data
US 2023/0244905 A1 Aug. 3, 2023

(51) Int. Cl.
*G06N 20/00* (2019.01)
*G06N 3/042* (2023.01)
*G06N 3/08* (2023.01)

(52) U.S. Cl.
CPC .............. *G06N 3/042* (2023.01); *G06N 3/08* (2013.01)

(58) Field of Classification Search
CPC .......... G06N 3/042; G06N 3/08; G06N 3/045; G06N 3/082; G06N 3/084
See application file for complete search history.

(56) References Cited

U.S. PATENT DOCUMENTS

| | | | |
|---|---|---|---|
| 11,829,866 B1* | 11/2023 | Feinstein | G06N 3/0455 |
| 11,893,480 B1* | 2/2024 | Riedmiller | G06N 3/045 |
| 2021/0081706 A1* | 3/2021 | Kiang | G06F 18/22 |
| 2021/0286989 A1* | 9/2021 | Zhong | G06F 40/177 |
| 2021/0295175 A1* | 9/2021 | Kennel | G06F 18/214 |

(Continued)

OTHER PUBLICATIONS

Kung, Po-Nien, et al. "Efficient multi-task auxiliary learning: Selecting auxiliary data by feature similarity." Proceedings of the 2021 Conference on Empirical Methods in Natural Language Processing. 2021 (Year: 2021).*

(Continued)

*Primary Examiner* — Andrew T Mcintosh
(74) *Attorney, Agent, or Firm* — Mintz, Levin, Cohn, Ferris, Glovsky and Popeo. P.C.; F. Jason Far-hadian, Esq.

(57) ABSTRACT

Systems, methods and products for quantitative translation of design requirements into a machine learning framework for training a classification model. A plurality of auxiliary tasks associated with a plurality of auxiliary task models are specified. The plurality of auxiliary task models are concurrently trained on the auxiliary tasks to generate one or more latent features learned by the plurality of auxiliary task models. The one or more latent features may be transferred from the plurality of auxiliary task models to augment a latent feature space of a target task for the classification model. Contribution levels of the transferred one or more latent features are adjusted based on design requirements for the target task for the classification model. First and second contribution levels are specified for respective first and second sets of auxiliary task latent features being quantified and enforced.

16 Claims, 6 Drawing Sheets

(56) References Cited

U.S. PATENT DOCUMENTS

2022/0092297 A1\* 3/2022 Gan .................. G06F 18/22
2022/0108174 A1\* 4/2022 Dauphin ............... G06F 18/217
2023/0290133 A1\* 9/2023 Wulfmeier ............ G06N 3/006

OTHER PUBLICATIONS

Liebel, Lukas, and Marco Körner. "Auxiliary tasks in multi-task learning." arXiv preprint arXiv:1805.06334 (2018) (Year: 2018).\*
Ruder, Sebastian, et al. "Latent multi-task architecture learning." Proceedings of the AAAI conference on artificial intelligence. vol. 33. No. 01. 2019 (Year: 2019).\*

\* cited by examiner

CONSTRAINED DESIGNED AND GUIDED LATENT FEATURE SPACE CONTRIBUTIONS TO MACHINE LEARNING MODELS

TECHNICAL FIELD

The disclosed subject matter generally relates to improvements to artificial intelligence (AI) systems, and more particularly to enhancements for a direct and quantitative translation of design requirements into a machine learning framework.

BACKGROUND

A classification model is generally implemented to transform an input feature space into a latent feature space. A classifier minimizes classification error based on training data and associated learned latent feature space. FIG. 1 illustrates example components of a conventional classification model. As shown, the hidden nodes in the middle represent transformation from input feature space to latent feature space and a classifier function is used to minimize misclassification error in the latent feature space.

The boundary between these two transformation and classification processes overlaps in the conventional AI training technologies. This is due to the classification being based on training data. The training influences and guides both the classifier and the transformation of the input feature space into the latent space. Data scientists have limited ability to determine or control the latent features learned during training and cannot easily determine the influence or contributions of these latent features in a model being trained. This lack of control can adversely impact a model's performance and the practical application of outcome data and subsequent decisioning.

Systems and methods are needed that can overcome the noted shortcomings and provide improvements over the conventional AI modeling and training technology by providing a direct and quantitative translation of design requirements into a fully data-driven machine learning framework, such that contributions of different characteristics of latent feature space are specified and guided toward a targeted learning objective.

SUMMARY

For purpose of summarizing certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, systems and methods are provided for specifying and guiding contributions of different characteristics of latent feature space for use in a targeted learning environment. The guided formation enables a prescribed control of contribution of latent feature subspaces of interest to decisioning processes in the target model. In one embodiment, a plurality of auxiliary tasks associated with a plurality of auxiliary task models are selected. The plurality of auxiliary task models are concurrently trained on the auxiliary tasks to generate one or more latent features learned by the plurality of auxiliary task models.

The one or more latent features may be transferred from the plurality of auxiliary task models to augment a latent feature space of a target task for the classification model. Contribution levels of the transferred one or more latent features are adjusted based on design requirements for the target task for the classification model. First and second contribution levels are specified for respective first and second sets of auxiliary task latent features being quantified and enforced based on first and second sets of auxiliary tasks. In some embodiments, contribution levels are specified for corresponding residual latent features learned in the classification model while maintain usage of the auxiliary task latent features at the first and second specified contribution levels in the training of the classification model.

In one implementation, expert knowledge may be used to choose the first set of auxiliary tasks associated with a first set of design requirements for the target task. A first set of auxiliary task latent features are produced through training of an auxiliary task model based on expert knowledge assignment of the target task and based on design requirements, wherein the first set of auxiliary tasks are embedded with one or more sets of auxiliary task latent features according to a selected contribution level of the first set of auxiliary task latent features to the target task. A second set of auxiliary task latent features are produced through training of an auxiliary task model based on expert knowledge assignment of target task and based on design requirements, wherein the second set of auxiliary tasks are embedded with one or more sets of auxiliary task latent features according to a selected contribution level of the second set of auxiliary task latent features to the target task.

In some aspects, the first set of auxiliary tasks is based on a first expert knowledge dataset different from the second set of auxiliary tasks based on a second expert knowledge dataset as specified in a global artificial intelligence design requirement. Translation of the design requirements into the machine learning framework includes applying quantitative contribution constraints to first and second set of latent features in the training of the target classification model. At least one auxiliary task model from the plurality of auxiliary task models is trained according to sets of learning parameters and selected latent bases functions as identified in the auxiliary model for transfer to a training model for the target classification model.

Depending on implementation, the training model may be based on a selected subset of the auxiliary latent features and constrained contribution learning parameters that correspond to the one or more transferred latent features. Residual latent features and constrained contribution learning parameters for the residual latent features are used with selected auxiliary latent features and the constrained contribution learning parameters to train a target classification model based on residual latent features independent of the one or more transferred auxiliary latent features. A multi-layer feed-forward neural network is used as training model for at least one of the plurality of auxiliary tasks, the multi-layer feed-forward neural network having a plurality of connected nodes with training parameters that are weights on forward connections between one or more nodes and bias terms on hidden nodes and end nodes of the multi-layer feed-forward neural network, wherein the latent features are output of the hidden nodes.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Figure 1:
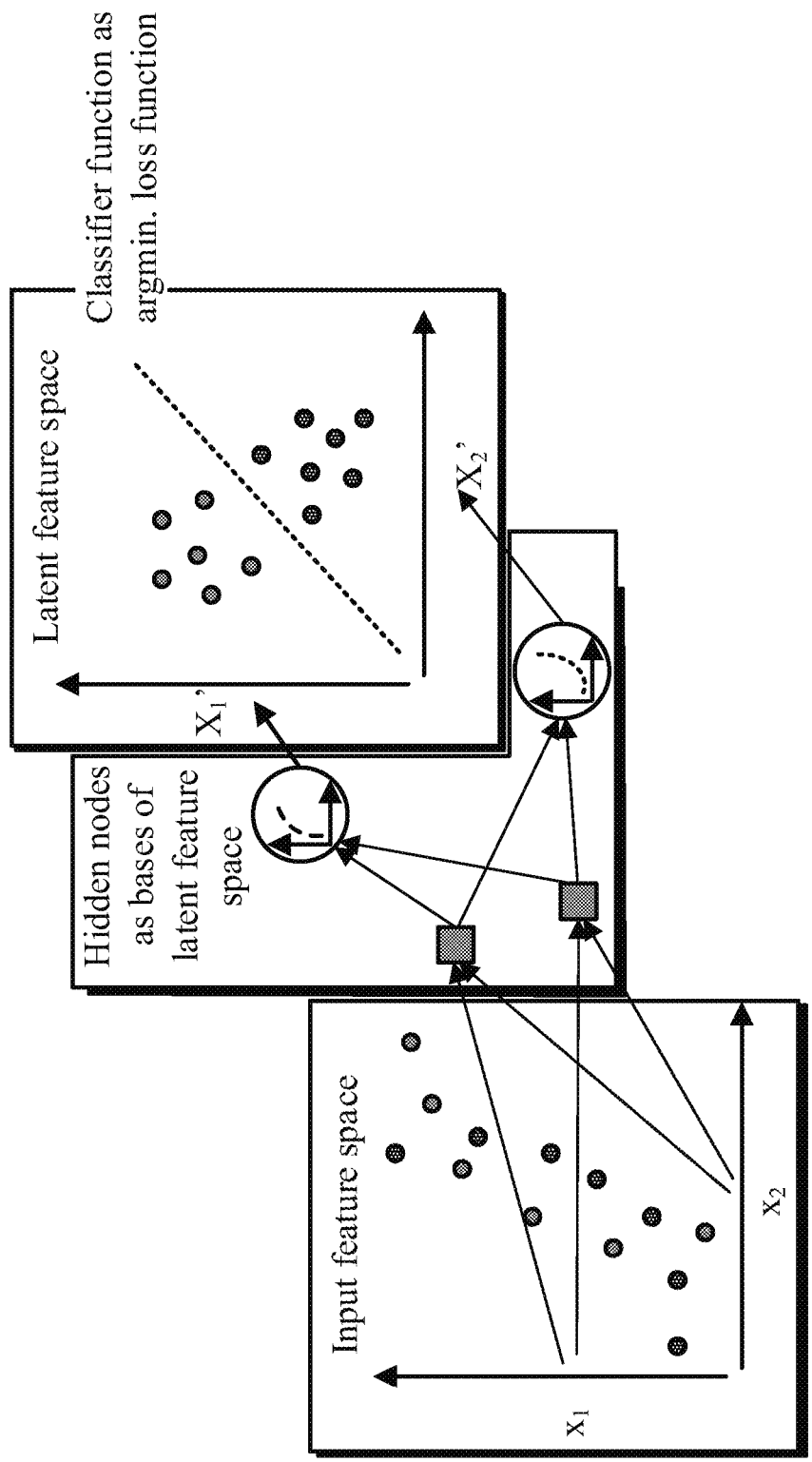
FIG. 1 illustrates example components of a conventional AI classification system.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more implementation, systems and methods are implemented that can overcome the shortcoming in the conventional AI training technology and provide improvements thereon by providing a direct and quantitative translation of design requirements into a fully data-driven machine learning framework, such that contributions of different characteristics of latent feature space are specified and guided toward a targeted learning objective and enable a prescribed control of contribution of latent feature subspaces of interest to the business and decisioning process in a target AI model.

Factors that impact latent features learned and used in AI models include raw data, target information, model architecture, objective function, model hyper-parameters and the pool of input features. To improve an AI model, the latent feature space may be expertly designed, as provided in further detail herein, to specify and control the contribution of the latent features in the classification model associated with business constraints and objectives. A complex non-linear model such as neural network may be chosen to achieve the desired performance with control over the formation of latent feature space and specifying the latent behaviors.

In certain embodiments, guiding the formation of both latent space from input features and the classifier estimation can be achieved based on the training data used to train an AI model. This, however, can result in model behaviors that are learned but are unknown to an AI model developer. As such added effort may be needed to discover the unknown model behavior to ensure model performance and explainability. Disadvantageously, such discovery doesn't provide the AI model developer with direct control on the latent feature space to best meet certain design-based classification requirements and expectations.

For example, in the case of a single layer fully connected neural network with non-linear activation function (e.g., a sigmoid function) in the hidden nodes, each hidden node can be thought of as a basis in the latent space. However, these bases are formed during training without any direct control from an AI model developer. This makes interpreting the non-linear transformation of the input feature space to the latent space formed at the first layer of the network either non-trivial or in many cases impossible. Further training algorithms that define complex latent features can lead to bias, instability, or disparate targeting of behaviors in the solution.

In accordance with one implementation, the formation and use of latent feature space is guided based on prior expert knowledge in contrast to conventional supervised models where formation is driven solely by training data and algorithm and out of control of the AI developer. This ability to specify and control the contribution of latent features is particularly desirable in AI models where business applications will specify the types of behaviors that they need models to emphasize or de-emphasize as they synthesis use of the model with the decisioning strategies. Guided AI formation provides for both quantification and control contribution of a group of guided latent features (i.e., a subset of latent space basis functions) to the targeted behavior of the model via a constrained optimization of the target objective function.

A semi-supervised training framework may be leveraged in certain instances where multiple selected auxiliary tasks are concurrently trained prior to the training of a target classification model or a target detection model. The newly generated latent features are then transferred from the auxiliary trainings tasks to augment the latent feature space of the target task. At the same time, contribution of these transferred latent features may be enforced to the target detection task based on model design requirement. Such contributions can be quantified and enforced based on consciously chosen auxiliary tasks as guided by expert knowledge to direct and control the formation of the corresponding latent features while control is constrained during the subsequent training of the neural network with the guided latent features of the target detection model.

In one or more aspects, an AI development and training computing system is provided that enables formation of latent feature space based on guidance from expert knowledge. The computing system is used to guide formation of the latent feature space based on semi-supervised model training of selected auxiliary tasks. Expert knowledge is used to select the auxiliary tasks geared towards the target task and to identify latent features of interest embedded in the auxiliary task models followed by guiding the augmentation of the latent feature space of training model of target task with the guided identified latent features and desired contribution levels to the target task.

In certain implementations, instead of using fully supervised training frameworks where the formation of latent features is driven by the training data through objective function optimization, control and interpretation of latent features and quantitative mapping of the features are limited. These limitations may be more severe in training models with complex architecture such as non-linear neural networks. An expert in contrast using the method described within can for example guide formation of latent feature space via choosing a set of auxiliary tasks selected based on the domain knowledge.

Various techniques may be used to translate design requirements to quantitative constraints on the latent space augmentation to guide its formation. For example, auxiliary training models may be implemented with given sets of learning parameters and selected latent bases functions (latent features) identified in the auxiliary task model to be transferred to the target training model. A target training model may be also used with a set of learning parameters, a subset of which corresponds to the transferred latent features. The remaining parameters may be part of the target model that form latent features independent of transferred latent features referred to as residual model. Well-defined functions, constrained along target model objective function optimization, of different sets of learning parameters may be also implemented to measure and constrain contributions of corresponding latent features (transferred or residual features).

Figure 2:
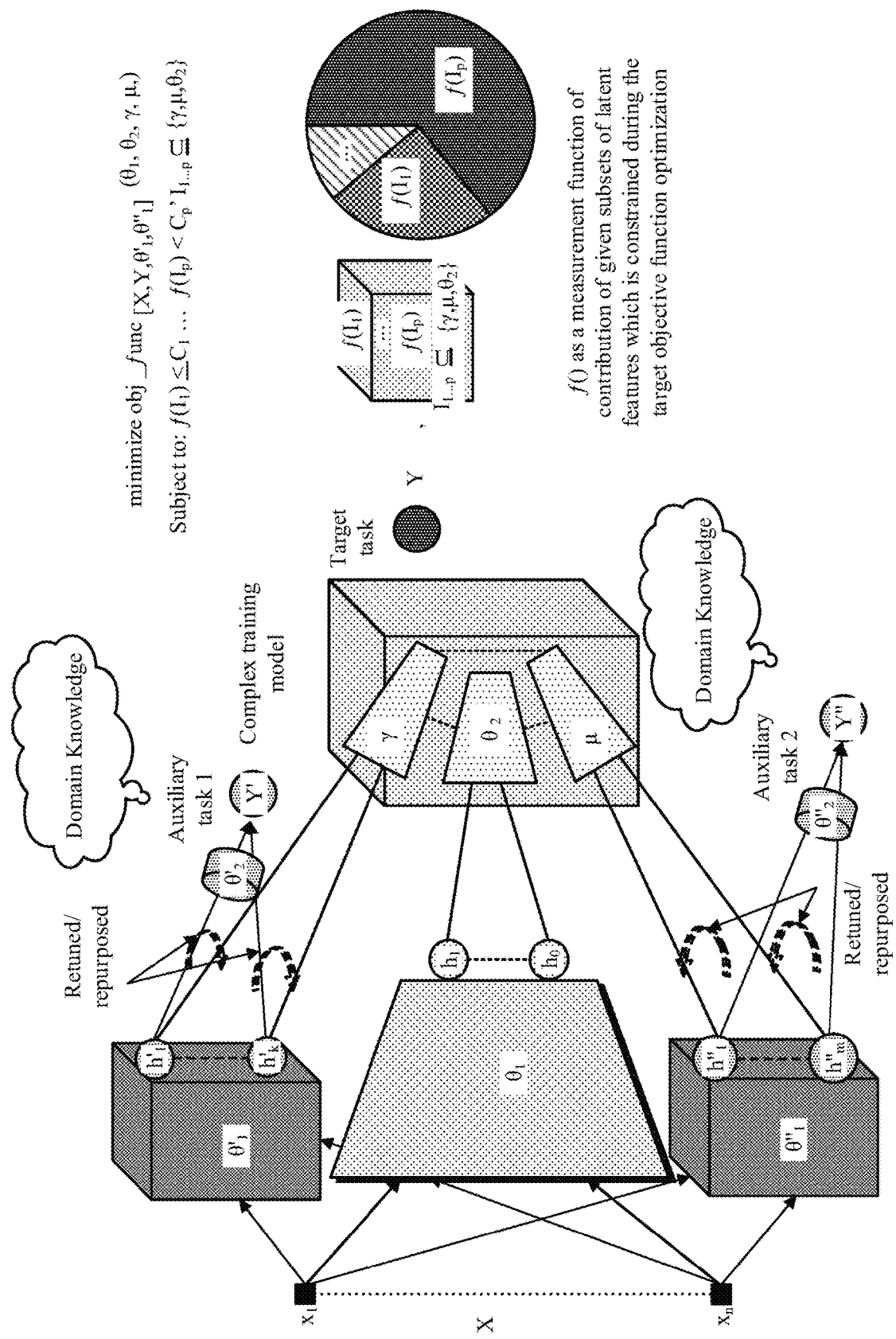
FIG. 2 is an example of a guided AI classification system, in accordance with one embodiment.

Referring to FIG. 2, example components of a guided AI system are illustrated. Two defined auxiliary tasks are provided by way of example. It is noteworthy, however, that in one implementation additional auxiliary tasks and guided latent features may be defined. their corresponding training parameters ($\theta_1'$, $\theta_1''$, $\theta_2'$, $\theta_2''$) and a target training model which itself includes transferred features from auxiliary tasks that contribute to the target task via the corresponding training parameters $\gamma$ and $\mu$ and a residual model which forms new latent features independent of the transferred ones and its corresponding training parameters $\theta_{1,2}^{\square}$ (left). The proposed system has also a set of functions $f(\ )$ over the latent features of target model which measure and constrain the contribution of given sets of latent features to the target task (right).

Corresponding training models to the tasks are highlighted and associated learning parameters are shown in each part of the models. Cuboid shapes and their associated learning parameters ($\theta_1'$ and $\theta_1''$ for tasks 1 and 2 respectively) represent parts of the auxiliary task models that are used to compute latent features that are going to be transferred to the target model. This means that learning parameters $\theta_1'$ and $\theta_1''$ and sets of latent features $h_i'$ nad $h_i''$ are fixed during training of target model. However, these transferred latent features would have a new set of corresponding learning parameters ($\gamma$ and $\mu$) in the target model which is trained to guide corresponding latent features toward the target model task. Residual latent features of target model would have learning parameters $\theta_{1,2}^{\square}$ and learned through the training process of the target task.

Referring back to FIG. 2, along with training models there is a set of constraints based on a function measuring contribution of different subsets of both transferred and residual latent features to the target model as shown on the right and specified by function $f(\ )$ These constraints are applied alongside of the target model objective function optimization and would guide and control contributions of selected and guided subsets of latent features to the target task. In this way, specific auxiliary tasks may be implemented based on business objectives. Moreover, one can specify the importance or contribution of the overall prediction contributions that sets of these auxiliary latent features contribute to the target task allowing for even further control by the AI scientists to meet business objectives. This allows for guiding representation of key auxiliary task behaviors and increasing or decreasing contribution per business objective.

Following is the set of example formulations of the system for model trainings:

minimize obj_func$_{[X,Y]}'(\theta_1', \theta_2')$ and minimize obj_func$_{[X,Y]}''(\theta_1'', \theta_2'')$         Equation 1 which solve for learning parameters of corresponding auxiliary tasks followed by:

minimize obj_func$_{[X,Y,\theta_1',\theta_1'']_{\square}}(\theta_1, \theta_2, \gamma, \mu)$ subject to: $f(I_1) \le C_1 \ldots f(I_p) \le C_p, I_{1 \ldots p} \subseteq \{\gamma, \mu, \theta_2\}$   Equation 2

Figure 3:
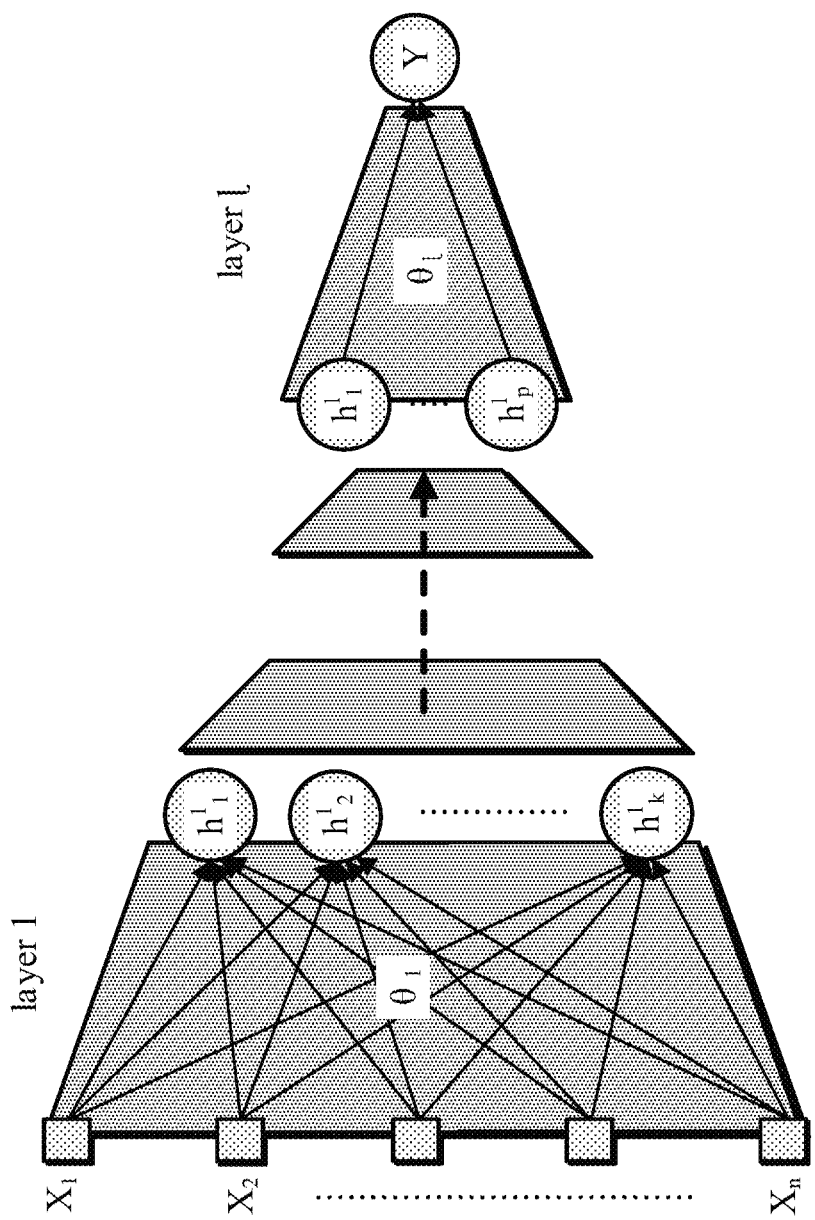
FIG. 3 is an example of a multi-layer feed-forward neural network as a directional acyclic graph network connecting input features X to response variables Y, in accordance with one embodiment.

Referring to FIG. 3, a multi-layer feed-forward neural network is provided as a directional acyclic graph network connecting input features X to one or more response variables Y. In one illustrative example, feed-forward neural network architecture may be used for training models for both auxiliary and target tasks, with the objective function of a feed-forward neural network being to maximize the likelihood of observations [X, Y] where X is input feature and Y is response variable(s) by estimation of non-random learning parameter $\theta$ (when there is no prior knowledge on $\theta$) of the joint probability distribution function of X and Y:

$$\left.\frac{\partial p_{[Y,X]}([Y, X]; \theta)}{\partial \theta}\right|_{\theta=\hat{\theta}_{ML}} = 0 \quad \text{Equation 3}$$

The likelihood function $p_{[Y,X]}([Y, X]; \theta)$ is modeled as a directional acyclic graph connecting input features X to response variable(s) Y (FIG. 3). The network can include multiple layers connecting features from previous layers (input features for the first layer or output of hidden nodes from previous inner layers) to hidden nodes of the current layer. Each connection carries a weight which is a subset of estimation parameters. Each hidden node has an activation function which is applied to aggregate the incoming connections with an added bias term. Mathematically speaking, output of a hidden node i in layer l is as following:

$$h_i^l = g(\sum_k w_{k,i}^{l-1} h_k^{l-1} + b_i^l) \qquad \text{Equation 4}$$

where $w_{k,i}^{l-1} \subseteq \theta$ are parameters of the network's forward connections from hidden nodes $h_1 \ldots k^{l-1}$, at level 'l−1' to hidden node $h_i^l$ at level 'l' and $b_i^l \subseteq \theta$ is the bias of the hidden node $h_i^l$. These parameters are to be estimated from Equation 1 during training and g( ) is activation function of choice often a piecewise linear function or a non-linear function such as a sigmoid.

A layer of the network can be thought as a transformation of feature space from last layer to the next layer via these hidden nodes which are basis functions of latent feature space and are the latent features that are transferred from auxiliary task models to a target model and with specified corresponding contributions to the target model. Moreover, assuming auxiliary latent features are transferred to the last layer of target model neural network and since the last layer of a neural networks is commonly modeled as a linear regression (or logistic regression in the case where response variable is binary and the task is detection) an appropriate function to measure contribution of latent features to the target task would be measuring L2-norms of the weights of connections from latent features to target task node.

Figure 4:
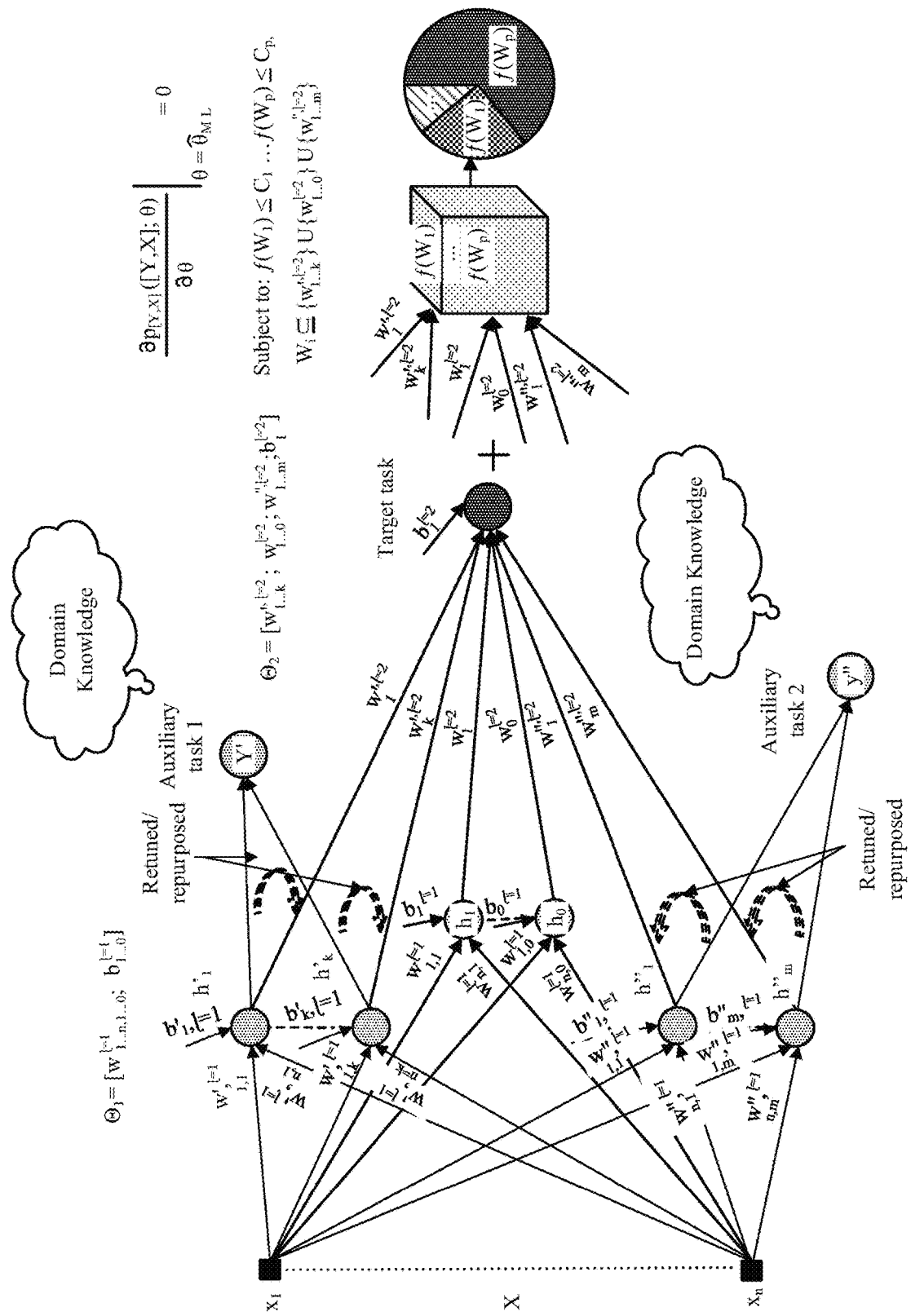
FIG. 4 is an example implementation of the system illustrated in FIG. 2 using a two-layer neural network as the training model, in accordance with one embodiment.

Referring to FIG. 4, the proposed system illustrated in FIG. 2 can be implemented using a two-layer neural network as a training models for the tasks and function $f(w_{I_i}) = \sqrt{\sum_{j \in I_i} w_j^2}$ measures contribution of subset of latent features via the L2-norm estimation of the corresponding weights. As shown, a two-layer feed-forward neural network is used as training models for all auxiliary and target tasks. Training parameters are the weights on forward connections of the networks plus bias terms on the hidden nodes and the end nodes. Latent features are output of the hidden nodes and are the ones that are transferred from auxiliary networks to target network. In this example embodiment, last layer of target model is a linear regression over the latent features which makes L2-norm function a suitable function to measure and constrain contributions of various sets of features to the target task.

The method of transferring auxiliary task latent features to a final target detection task applies to any model development, credit risk, marketing, fraud, cyber security, to name a few. In the following, however, an illustrative example application of the implementation of the system of FIG. 4 is provided as applied to a binary target detection task used for a decision-making strategy which in this case is to review a financial transaction for a possibility of fraud. Different auxiliary tasks based on the business objectives are used to guide the final target model and subsequent decision strategy is applied to the output of the target detection task.

Example Application: Fraud Modeling

The exemplifying data is a historical sequence of debit card transactions which includes a tag that identifies fraudulent transactions. The goal is to train a model for fraud detection (fraud model). However, detection accuracy is not the only desired aspect of the trained model. We would also like to guide various characteristics of latent feature space and control their contribution to the fraud model. Such characteristics are usually identified based on expert knowledge or specific design requirement. Our invention enables us to translate a given design requirement to a constrained training of the target fraud detection model with specific transferred auxiliary latent features.

In the exemplar scenario, we are working with low amount card-not-present (CNP) debit transactions. A subclass of interest among these transactions is app purchase and online betting transactions—this forms the business requirements for the model. Based on prior expert knowledge app purchase and online betting span a unique latent feature space in fraud model and are generally underrepresented in the data. And similarly, based on expert knowledge, predominant characteristics of this unique latent feature space are velocity and time of the day of transactions. In the following implementation, we demonstrate the guided AI invention by incorporating constrained expert knowledge into the design of a fraud model.

Figure 5:
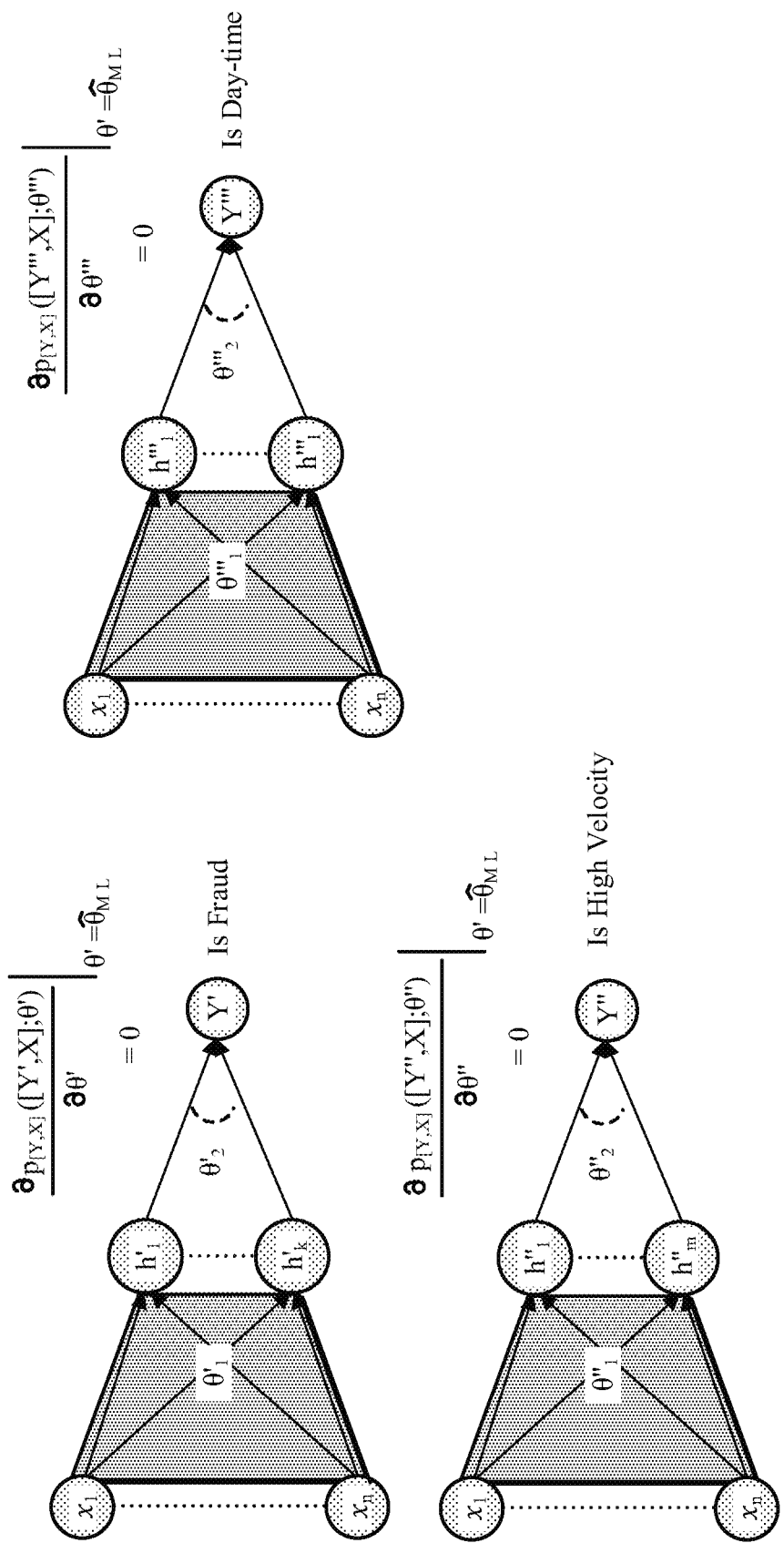
FIG. 5 illustrates an example implementation of a guided AI system configured to translate design requirement and domain knowledge into quantitative constraints to guide and train a target model, in accordance with one or more embodiments.

Referring to FIG. 5, based on expert domain knowledge, three auxiliary tasks are defined to capture predominant characteristics of latent space related to the sub-class of interest. Corresponding latent feature of this sub-class are later transferred to the target fraud model. First, multiple two-layer feed-forward neural networks are trained on the defined two business objectives of CNP app purchase and CNP online betting as our auxiliary networks to form the latent feature space identifying risky app purchase and online betting behavior.

In one aspect, the desired characteristics described by the expert are incorporated by setting the response variable of a network to be binarized versions of transaction velocity (high vs low velocity), time of day (daytime vs nighttime) and fraud tag (fraud vs non-fraud) (FIG. 5 illustrates the networks of auxiliary tasks in FIG. 4 but now with three auxiliary tasks). Derived latent features are transferred to the last-layer of the target fraud detection network which same as target model in FIG. 4, is modelled as a two-layer neural network. The transferred features are fixed and are of the forms $h_i^* = g(\sum_{j=1}^n w_{i,j}^{*,l=1\square} x_j + b_i^{*,l=1})$ based on the outcome of the auxiliary task training.

The last and second layer of target detection model may be set to be a logistic regressor (which is true for majority of detection models). As shown in the below equation, left-hand side of logistic regression equation is a log-odds transformation of binary response random variable Y (based on the assumption of Bernoulli distribution of Y) and the right-hand side is a linear regression on latent features:

$$logit(Pr(Y = 1 \mid X = x)) = \qquad \text{Equation 5}$$
$$b_1^{l=2} + [w_{1\ldots k}^{'}] \times [h_{1\ldots k}^{'}(x)]^T + [w_{1\ldots m}^{''}] \times [h_{1\ldots m}^{''}(x)]^T +$$
$$[w_{1\ldots l}^{'''}] \times [h_{1\ldots l}^{'''}(x)]^T + [w_{1\ldots o}] \times [h_{1\ldots o}(x)]^T + \varepsilon^2$$

where $[h_{1\ldots k}'(x)]^T$, $[h_{1\ldots m}''(x)]^T$ and $[h_{1\ldots l}'''(x)]^T$ are the transferred basis functions of latent space from auxiliary tasks and are fixed and $[h_{1\ldots o}(x)]^T$ are newly formed residual latent features during training of target fraud-detection model.

As mentioned earlier, the contribution of latent features can be measured using the L2-norm of the last layer training parameters $\{w_{1\ldots k}'\} \cup \{w_{1\ldots m}''\} \cup \{w_{1\ldots l}'''\} \cup \{w_{1\ldots o}\}$ in Equation 5. L2-norm function, as well as any convex transformation of it, is still a convex function and can be constrained along any objective function optimization. Specifically in this exemplar, we are interested in constraining L2-norm ratio of a selected group of $w_\square$'s, $B_\square$'s during objective function optimization of the fraud detection model.

L2-norm ratio enables us to control relative contribution of the group of parameters on numerator to the contribution of the group of parameters in denominator. For example, a constraint of the form $$\frac{\sum_1^k w'^2 + \sum_1^m w''^2 + \sum_1^l w'''^2}{\sum_1^k w'^2 + \sum_1^m w''^2 + \sum_1^l w'''^2 + \sum_1^o w^2} < C$$

enables us to limit contribution of transferred latent to a target percentage (controlled by C) of overall detection power of the model, hence meeting a contribution level of guided auxiliary task latent features consistent with the expert business objectives associated with the guided AI development. Such contribution formula can also specify contribution levels for each specific auxiliary task latent features by class type, such as $C_\square'$, $C_\square''$, and $C_\square'''$. Overall detection power of the model is estimated as the aggregate L-2 norm of corresponding parameters of transferred as well as parameters of newly formed features ($[w_1 \ldots _o]$ of $[h_1 \ldots _o(x)]$) in the second stage.

In the initial training of the fraud detection model, no constraints are enforced on the contribution of latent features. This gives us a baseline on the unconstraint contribution of the transferred latent features to the fraud detection model. Our result shows that the aggregate relative contribution (L2-norm ratio) coming from the transferred features that characterize time of day and velocity of transactions as well as the fraud detection is ~0.02 (2%).

In one aspect the target is to increase the ratio 10× to 0.2 to increase performance of our fraud model detection on the CNP app and CNP online betting transactions that the transferred latent features are representing. This results in increasing the detection of fraud transaction among the sub-segment of interest by the target model by 16.8% at 0.5% rate of false positive demonstrating the success of guiding specific detection archetypes based on business objectives and use of the guided AI invention.

Figure 6:
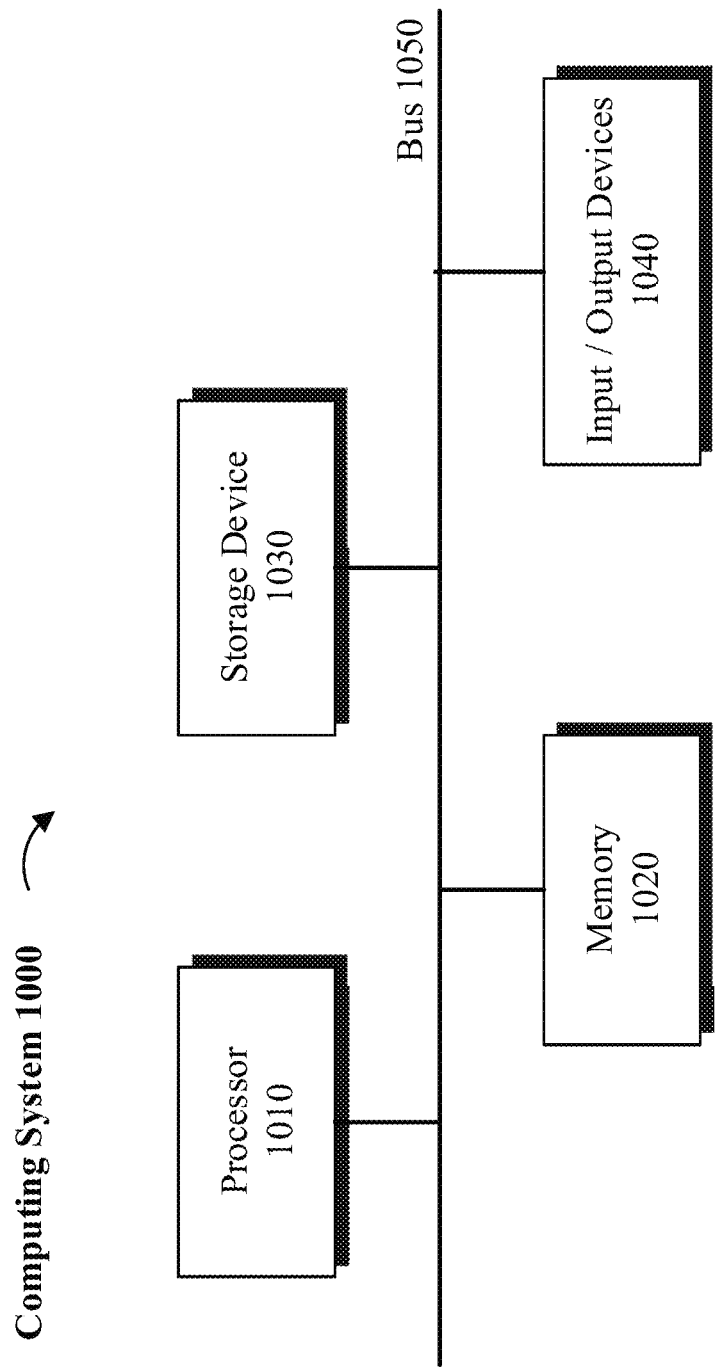
FIG. 6 is a block diagram of an example computing system that may be utilized to perform one or more computing operations or processes as consistent with one or more disclosed features.

Referring to FIG. 6, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 6, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately"

may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The applicant has no objection to the reproduction of the patent documents or the patent disclosure as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A method for quantitative translation of design requirements into a machine learning framework for training a classification model, the method embedded in a non-transitory machine-readable medium in form of executable instructions to cause at least one programmable processor to perform operations comprising:
    selecting a plurality of auxiliary tasks associated with a plurality of auxiliary task models;
    concurrently training the plurality of auxiliary task models on the auxiliary tasks to generate one or more latent features learned by the plurality of auxiliary task models;
    transferring the one or more latent features from the plurality of auxiliary task models to augment a latent feature space of a target task for the classification model;
    adjusting contribution levels of the transferred one or more latent features based on design requirements for the target task for the classification model;
    specifying first contribution levels for a first set of auxiliary task latent features being quantified and enforced based a first set of auxiliary tasks;
    specifying second contribution levels for a second set of auxiliary task latent features being quantified and enforced based on a second set of auxiliary tasks; and
    specifying contribution levels of corresponding residual latent features learned in the classification model while maintain usage of the auxiliary task latent features at the first and second specified contribution levels in the training of the classification model,
    wherein expert knowledge is used to choose the first set of auxiliary tasks associated with a first set of design requirements for the target task,
    wherein a first set of auxiliary task latent features are produced through training of an auxiliary task model based on expert knowledge assignment of the target task and based on design requirements, wherein the first set of auxiliary task models produce one or more sets of auxiliary task latent features that are used at a selected contribution level of the first set of auxiliary task latent features to the target task,
    wherein a second set of auxiliary task latent features are produced through training of an auxiliary task model based on expert knowledge assignment of target task and based on design requirements, wherein the second set of auxiliary task models produce one or more sets of auxiliary task latent features that are used at selected contribution level of the second set of auxiliary task latent features to the target task, and
    wherein the first set of auxiliary tasks is based on a first expert knowledge dataset different from the second set of auxiliary tasks based on a second expert knowledge dataset as specified in a global artificial intelligence design requirement.

2. The method of claim 1, wherein translation of the design requirements into the machine learning framework includes applying quantitative contribution constraints to first and second set of latent features in the training of the target classification model.

3. The method of claim 1, wherein at least one auxiliary task model from the plurality of auxiliary task models is trained according to sets of learning parameters and selected latent bases functions as identified in the auxiliary model for transfer to a training model for the target classification model.

4. The method of claim 3, wherein the training model is implemented based on a selected subset of the auxiliary latent features and constrained contribution learning parameters that correspond to the one or more transferred latent features.

5. The method of claim 4, wherein residual latent features and constrained contribution learning parameters for the residual latent features are used with selected auxiliary latent features and the auxiliary task constrained contribution learning parameters to train a target classification model based on auxiliary task and residual task latent features, where the residual latent features are learned in training the target task model.

6. The method of claim 1, wherein a multi-layer feed-forward neural network is used as training model for at least one of the plurality of auxiliary tasks, the multi-layer feed-forward neural network having a plurality of connected nodes with training parameters that are weights on forward connections between one or more nodes and bias terms on hidden nodes and end nodes of the multi-layer feed-forward neural network, wherein the latent features are output of the hidden nodes.

7. A system for quantitative translation of design requirements into a machine learning framework for training a classification model, the system comprising:
    at least one programmable processor; and
    a non-transitory machine-readable medium storing instructions that, when executed by the at least one programmable processor, cause the at least one programmable processor to perform operations comprising:
    selecting a plurality of auxiliary tasks associated with a plurality of auxiliary task models;
    concurrently training the plurality of auxiliary task models on the auxiliary tasks to generate one or more latent features learned by the plurality of auxiliary task models;
    transferring the one or more latent features from the plurality of auxiliary task models to augment a latent feature space of a target task for the classification model;
    adjusting contribution levels of the transferred one or more latent features based on design requirements for the target task for the classification model;
    specifying first contribution levels for a first set of auxiliary task latent features being quantified and enforced based a first set of auxiliary tasks;
    specifying second contribution levels for a second set of auxiliary task latent features being quantified and enforced based on a second set of auxiliary tasks; and
    specifying contribution levels of corresponding residual latent features learned in the classification model while maintain usage of the auxiliary task latent features at the first and second specified contribution levels in the training of the classification model,
    wherein expert knowledge is used to choose the first set of auxiliary tasks associated with a first set of design requirements for the target task,
    wherein a first set of auxiliary task latent features are produced through training of an auxiliary task model based on expert knowledge assignment of the target task and based on design requirements, wherein the first set of auxiliary task models produce one or more sets of auxiliary task latent features that are used at a selected contribution level of the first set of auxiliary task latent features to the target task, wherein a second set of auxiliary task latent features are produced through training of an auxiliary task model based on expert knowledge assignment of target task and based on design requirements, wherein the second set of auxiliary task models produce one or more sets of auxiliary task latent features that are used at selected contribution level of the second set of auxiliary task latent features to the target task, and wherein the first set of auxiliary tasks is based on a first expert knowledge dataset different from the second set of auxiliary tasks based on a second expert knowledge dataset as specified in a global artificial intelligence design requirement.

8. The system of claim 7, wherein translation of the design requirements into the machine learning framework includes applying quantitative contribution constraints to first and second set of latent features in the training of the target classification model.

9. The system of claim 7, wherein at least one auxiliary task model from the plurality of auxiliary task models is trained according to sets of learning parameters and selected latent bases functions as identified in the auxiliary model for transfer to a training model for the target classification model.

10. The system of claim 9, wherein the training model is implemented based on a selected subset of the auxiliary latent features and constrained contribution learning parameters that correspond to the one or more transferred latent features.

11. The system of claim 10, wherein residual latent features and constrained contribution learning parameters for the residual latent features are used with selected auxiliary latent features and the auxiliary task constrained contribution learning parameters to train a target classification model based on auxiliary task and residual task latent features, where the residual latent features are learned in training the target task model.

12. A computer program product for quantitative translation of design requirements into a machine learning framework for training a classification model, the computer program product comprising a non-transitory machine-readable medium storing instructions that, when executed by at least one programmable processor, cause the at least one programmable processor to perform operations comprising:

selecting a plurality of auxiliary tasks associated with a plurality of auxiliary task models;

concurrently training the plurality of auxiliary task models on the auxiliary tasks to generate one or more latent features learned by the plurality of auxiliary task models;

transferring the one or more latent features from the plurality of auxiliary task models to augment a latent feature space of a target task for the classification model;

adjusting contribution levels of the transferred one or more latent features based on design requirements for the target task for the classification model;

specifying first contribution levels for a first set of auxiliary task latent features being quantified and enforced based a first set of auxiliary tasks;

specifying second contribution levels for a second set of auxiliary task latent features being quantified and enforced based on a second set of auxiliary tasks; and specifying contribution levels of corresponding residual latent features learned in the classification model while maintain usage of the auxiliary task latent features at the first and second specified contribution levels in the training of the classification model, wherein expert knowledge is used to choose the first set of auxiliary tasks associated with a first set of design requirements for the target task, wherein a first set of auxiliary task latent features are produced through training of an auxiliary task model based on expert knowledge assignment of the target task and based on design requirements, wherein the first set of auxiliary task models produce one or more sets of auxiliary task latent features that are used at a selected contribution level of the first set of auxiliary task latent features to the target task, wherein a second set of auxiliary task latent features are produced through training of an auxiliary task model based on expert knowledge assignment of target task and based on design requirements, wherein the second set of auxiliary task models produce one or more sets of auxiliary task latent features that are used at selected contribution level of the second set of auxiliary task latent features to the target task, and wherein the first set of auxiliary tasks is based on a first expert knowledge dataset different from the second set of auxiliary tasks based on a second expert knowledge dataset as specified in a global artificial intelligence design requirement.

13. The computer program product of claim 12, wherein at least one auxiliary task model from the plurality of auxiliary task models is trained according to sets of learning parameters and selected latent bases functions as identified in the auxiliary model for transfer to a training model for the target classification model.

14. The computer program product of claim 13, wherein the training model is implemented based on a selected subset of the auxiliary latent features and constrained contribution learning parameters that correspond to the one or more transferred latent features.

15. The computer program product of claim 12, wherein a multi-layer feed-forward neural network is used as training model for at least one of the plurality of auxiliary tasks, the multi-layer feed-forward neural network having a plurality of connected nodes with training parameters that are weights on forward connections between one or more nodes and bias terms on hidden nodes and end nodes of the multi-layer feed-forward neural network, wherein the latent features are output of the hidden nodes.

16. The computer program product of claim 12, wherein translation of the design requirements into the machine learning framework includes applying quantitative contribution constraints to first and second set of latent features in the training of the target classification model.

* * * * *